United States Patent [19]

Oliver

[11] Patent Number: 4,497,630
[45] Date of Patent: Feb. 5, 1985

[54] KIT FOR TEACHING CHARACTERISTICS AND USE OF ELECTRICAL DEVICES

[75] Inventor: Roland A. G. Oliver, Tuscaloosa, Ala.

[73] Assignee: Alabama Power Company, Birmingham, Ala.

[21] Appl. No.: 589,486

[22] Filed: Mar. 14, 1984

[51] Int. Cl.³ .............................................. G09B 23/18
[52] U.S. Cl. .................................. 434/224; 434/380; 190/107; 206/319
[58] Field of Search .............. 434/224, 301, 379, 380, 434/300, 302, 219; 217/45; 190/107, 114, 115; 206/319, 328

[56] References Cited

U.S. PATENT DOCUMENTS

| | | |
|---|---|---|
| 603,875 | 5/1898 | Crowell ............................. 434/380 |
| 742,408 | 10/1903 | Evans et al. ....................... 434/380 |
| 2,208,503 | 7/1940 | Manuel ............................... 434/380 |
| 2,524,804 | 10/1950 | Irby ................................... 434/301 |
| 2,859,540 | 11/1958 | Himpele ............................. 434/224 |
| 3,008,245 | 11/1961 | Meuche .............................. 434/224 |
| 3,043,022 | 7/1962 | Crews et al. ....................... 434/224 |
| 3,266,175 | 8/1966 | Palumbi ............................. 434/302 |
| 3,310,886 | 3/1967 | Tudor ................................. 434/380 |
| 4,006,538 | 2/1977 | Valentine .......................... 434/314 |
| 4,127,785 | 11/1978 | Noguchi ......................... 434/224 X |

Primary Examiner—William H. Grieb
Attorney, Agent, or Firm—Roylance, Abrams, Berdo & Goodman

[57] ABSTRACT

A kit for use in teaching characteristics and use of electrical devices, such as motors. The kit makes it possible to transport with relative ease both one or more heavy electrical devices and the additional teaching aids required for demonstrating such devices and their proper use.

7 Claims, 10 Drawing Figures

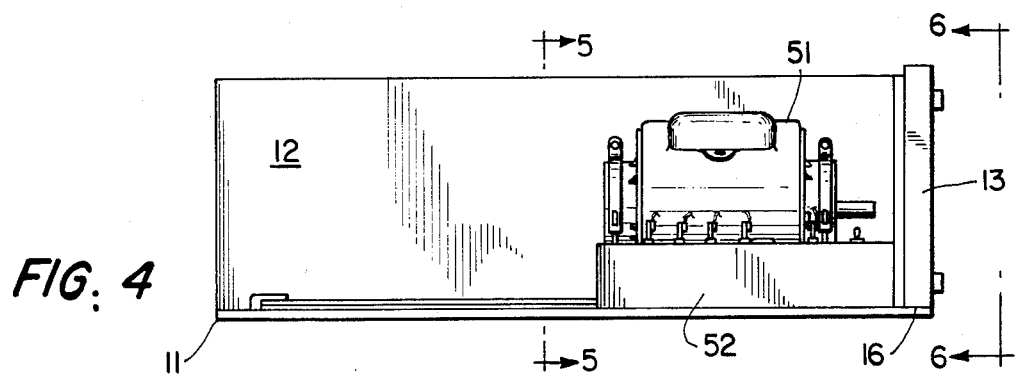
FIG. 4
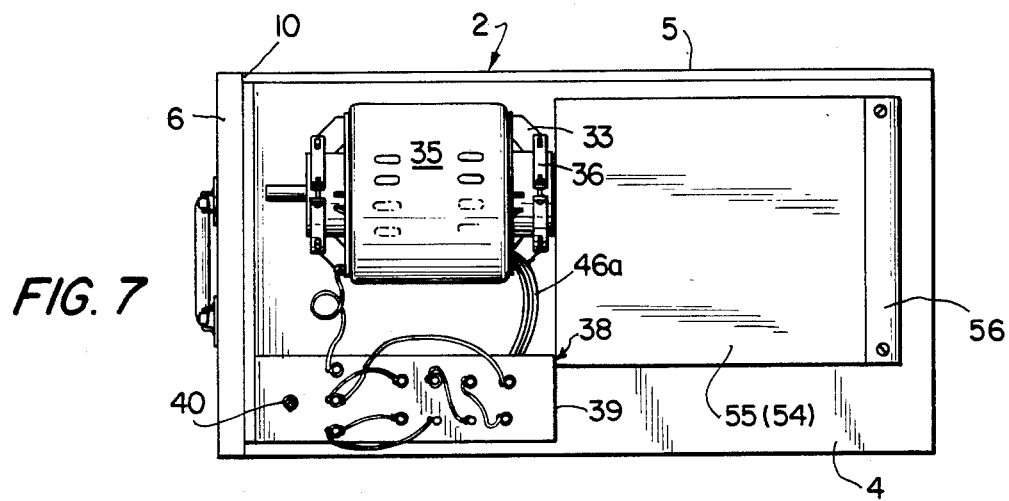
FIG. 7
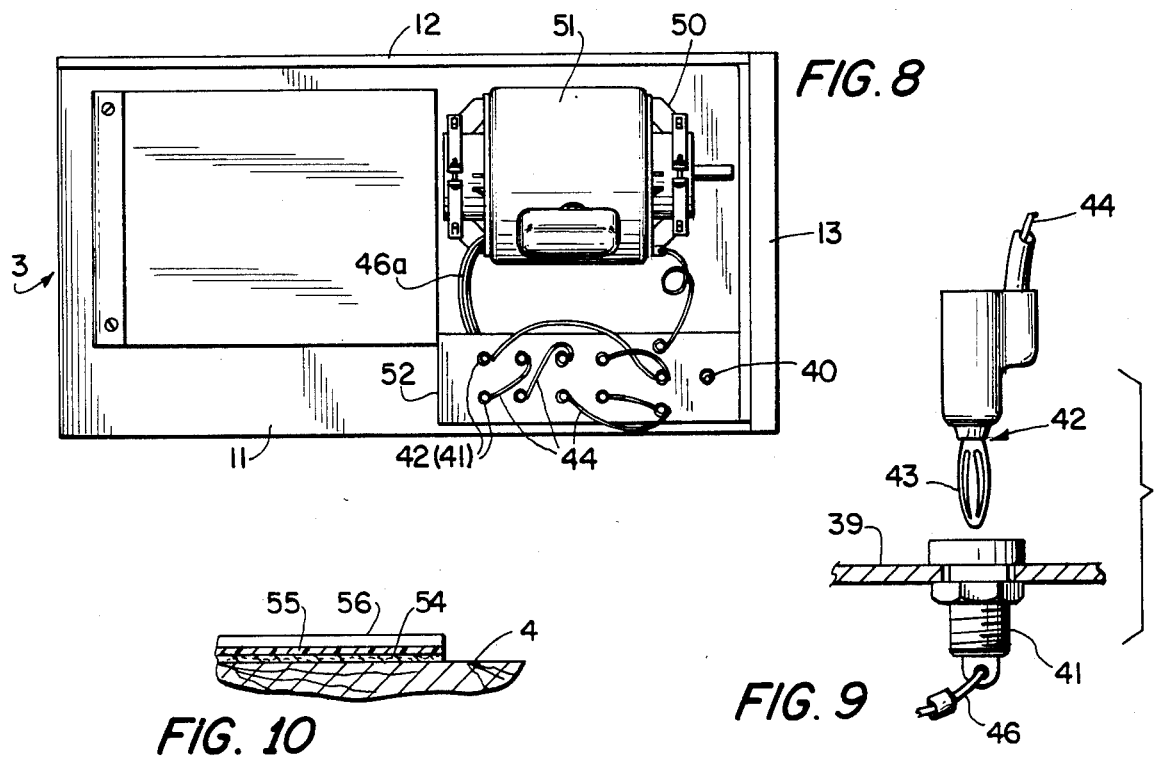
FIG. 8
FIG. 9
FIG. 10

KIT FOR TEACHING CHARACTERISTICS AND USE OF ELECTRICAL DEVICES

This invention relates to teaching aids, particularly to kits for use in teaching the characteristics of and use of electrical devices such as electrical motors and other devices which must be connected electrically in a given fashion to perform in a desired manner.

BACKGROUND OF THE INVENTION

In teaching generally, and particularly in teaching technical subjects, a continuing problem has been that of providing the student with meaningful exposure to equipment involved in the subject being taught. This is particularly true when the subject involves electrical devices and the manner of their proper use, since the appearance of the device may differ remarkably from what is shown in schematic diagrams used to illustrate the principles of operation and the manner of use of such devices. Thus, the student must learn not only what is shown in schematic diagrams but also how such diagrams relate to the actual devices. To accomplish this, it is frequently desirable to transport one or more actual devices, the appropriate schematic diagrams and test materials to a classroom, laboratory or other place where students are to be taught. Particularly when more than one device is involved, it is advantageous to arrange all portions of the lesson material in an organized fashion, and prior-art workers have provided educational kits including both an electrical device and a schematic diagram appropriate for the device, both mounted on a support member, U.S. Pat. No. 2,208,503 Manuel and U.S. Pat. No. 3,008,245 Mueche being typical of such prior-art devices.

Providing an educational kit for use in training students to understand and properly use electrical devices, particularly motors, appears to have presented particular difficulties in the prior art. Teaching aids for such purposes have been proposed, as seen for example in U.S. Pat. Nos. 603,875 Crowell, 742,408 Evans et al, 3,310,886 Tudor and 4,127,785 Noguchi, but such prior-art devices have been cumbersome and difficult to transport, particularly when more than one device is to be exhibited so that, e.g., two devices and two sets of related materials must be handled. In an effort to overcome such deficiencies, it has been proposed to place the electrical device and related materials in a single container, as seen for example in U.S. Pat. Nos. 3,043,022 Crews et and 4,006,538 Valentine, and such proposals have offered improvement in the case of relatively small devices and materials. There has been a continuing need for improvement in such teaching aids when relatively large and heavy electircal devices are employed, especially when it is appropriate to deal with two such devices in a single session.

OBJECTS OF THE INVENTION

A general object of the invention is to devise a kit, for use in teaching the characteristics and use of electrical devices, which makes it possible to transport with relative ease both a relatively heavy electrical device and the additional teaching aids, such as schematic diagrams and means for making electrical connections, required for demonstrating the device and its proper use.

Another object is to provide such a kit which is more compact and easy to transport than has been the case for prior-art teaching aids.

A further object is to devise a kit of the type described which is readily and easily converted from a closed condition, for transport, to an open condition for use.

Yet another object is to provide a kit comprising two relatively heavy electrical motors, with the kit occupying a minimum space when closed for transport and presenting the motors and appropriate teaching aids in optimum fashion for teaching when the kit is open.

SUMMARY OF THE INVENTION

Educational kits according to the invention comprise two housing units each so constructed and arranged that the two units can be interfitted to define a closed housing with the end walls of the two units disposed at different ends of the housing, a mounting device on one side wall of one of the housing units for mounting a first electrical device on a portion of that side wall adjacent one end thereof with the first electrical device so disposed as to be enclosed within the housing when the two housing units are fitted together; another mounting device on one side wall of the other of the housing units for mounting a second electrical device on a portion of that side wall adjacent one end thereof with the second electrical device so disposed as to be enclosed within the housing and located at the end of the housing opposite the position occupied by the first electrical device when the two housing units are fitted together; and releasable fastener means for securing the two housing units together when the housing units are interfitted. The side walls are typically of elongated rectangular form, so that the housing formed by interfitting the two units has the form of a parallelepiped, the mounting devices are disposed adjacent the end wall of the respective housing units, a changeable connector assembly is mounted on the side wall adjacent each mounting device, a major portion of the inner face of the side wall is left free and open when the mounting device and connector assembly are in place, and a markable and erasable circuit instruction sheet is secured to that portion of the inner face of the side wall, the arrangement being such that, when removed from the housing, each housing unit can be supported on a table or work bench with the electrical device, changeable connector assembly and instruction sheet freely exposed upwardly for access by the student. A handle is provided, advantageously on one of the two end walls. When mounted on the respective side walls, the two electrical devices occupy only a portion of the total area of the inner face of the respective side wall, leaving the balance of that face free for attachment of, e.g., a circuit diagram overlaid by a transparent sheet upon which the student can mark with a grease pencil or the like. The lengths of the side walls are, e.g., more than twice the overall lengths of the two electrical devices so that, when the housing is assembled, both electrical devices are freely accommodated and there is sufficient additional space within the housing to accommodate, e.g., two connector boxes and appropriate electrical conductors. Advantageously, each end wall is provided with a connector unit via which the respective electrical device can be connected to a power source or other component external to the housing.

IDENTIFICATION OF THE DRAWINGS

FIG. 4 is a side elevational view of a second housing unit, with a second motor and connector block mounted thereon, forming part of the kit of FIG. 1;

FIG. 7 is a top plan elevational view of the housing unit of FIG. 2;

FIG. 8 is a top plan elevational view of the housing unit of FIG. 4;

FIG. 9 is an exploded side elevational view of one typical form of connector used in the kit of FIG. 1;

FIG. 10 is a fragmentary cross-sectional view taken generally on line 10—10, FIG. 2, and enlarged with respect to FIGS. 1-9.

DETAILED DESCRIPTION OF THE INVENTION

Figure 1:
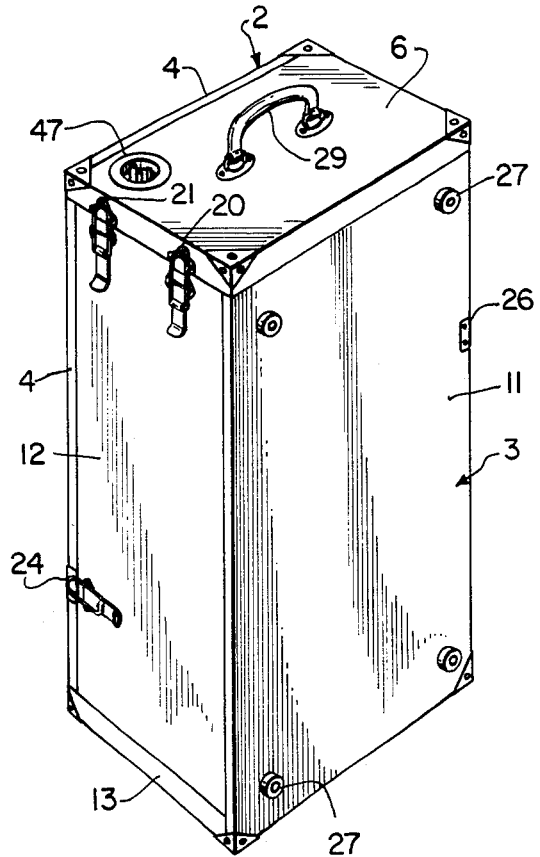
FIG. 1 is a perspective view of an educational kit, according to one embodiment of the invention, constructed for teaching the characteristics of and methods for connecting two different electrical motors, showing the housing closed and latched.
Figure 3:
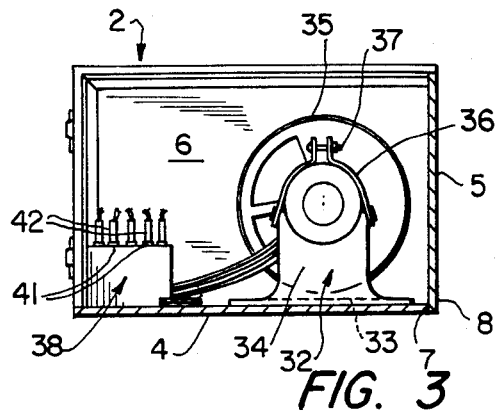
FIG. 3 is a transverse cross-sectional view taken generally on line 3—3, FIG. 2.
Figure 5:
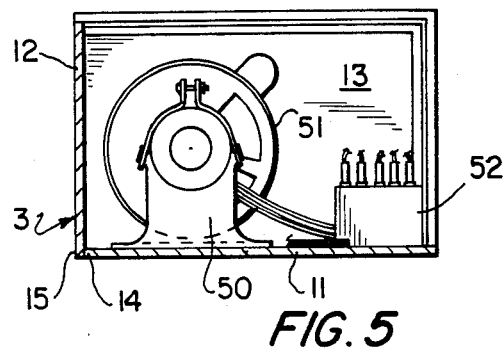
FIG. 5 is a transverse cross-sectional view taken generally on line 5—5, FIG. 4.
Figure 6:
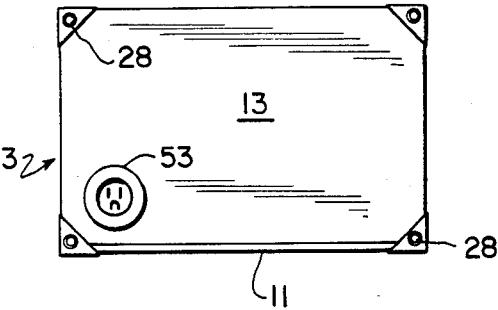
FIG. 6 is an end elevational view of the unit of FIG. 4, taken generally on line 6—6, FIG. 4.

The embodiment chosen to illustrate the invention is an educational kit, indicated generally at 1, FIG. 1, for use in teaching the characteristics and proper use of two different types of electrical motors. The kit comprises two housing units, indicated generally at 2 and 3, which can be placed separately on a supporting surface, in the positions seen in FIGS. 2 and 4, respectively, or fitted together to define the closed housing seen in FIG. 1. Housing unit 2 comprises two side walls 4,5 and an end wall 6, all three walls being of elongated rectangular plan form, the side walls being considerably longer than the end wall. Side walls 4 and 5 are secured rigidly together along coextensive long edge portions 7 and 8 thereof, as by adhesive, screws or other conventional means, with the flat side walls lying at right angles to each other, as seen in FIG. 3. As will be seen by comparing FIGS. 2 and 7, the end edges of side walls 4,5 opposite end wall 6 lie in a common plane, and side wall 5 is shorter than side wall 4 by the thickness of end wall 6. End wall 6 has one long edge 9 engaged with and rigidly secured to one end edge portion of side wall 4 and one short edge portion 10 engaged with and secured rigidly to the corresponding end of side wall 5. Side walls 4,5 are of the same thickness and the width of side wall 5 is shorter than the corresponding edge of end wall 6 by the thickness of the side walls, as will be clear from FIG. 2.

Housing unit 3 comprises two side walls 11,12 and an end wall 13, all three walls being of elongated rectangular form, side walls 11.12 having the same dimensions as do side walls 4 and 5, respectively, and end wall 13 having the same dimensions as end wall 6. Side walls 11,12 are secured rigidly together along coextensive long edge portions 14 and 15 thereof, with the flat side walls lying at right angles to each other. The end edges of side walls 11 and 12 opposite end wall 13 lie in a common transverse plane. Side wall 12 is shorter than side wall 11 by the thickness of end wall 13. End wall 13 has one long edge 16 engaged with and secured rigidly to the inner face of one end edge portion of side wall 11 and one short edge portion 17 engaged with and secured rigidly to the corresponding end of side walll 12. Side walls 11,12 are of the same thickness, that thickness being equal to the thickness of walls 4 and 5, and the width of side wall 12 is shorter than the corresponding edge of end wall 13 by the thickness of the side walls.

Comparing FIG. 1 with FIGS. 2-8, it will be seen that housing units 2 and 3 can be fitted together to form the closed housing 1 which is of parallelepiped form, with walls 4, 5, 11 and 12 forming four long sides of the housing and walls 6 and 13 forming the end walls of the housing. With the two housing units thus fitted together, side wall 12 of unit 3 is secured to end wall 6 of unit 2 by two conventional releasable fasteners each comprising a catch member 20 secured to the edge of wall 6 and a pivoted fastener member 21 forming part of a fastener unit secured to side wall 12. Side wall 5 of unit 2 is secured to end wall 13 of unit 3 in the same fashion by two releasable fasteners each comprising a catch member 22 secured to the edge of wall 13 and a pivoted fastener member 23, FIG. 2, secured to side wall 5 of unit 2. In a location nearer end wall 13 than end wall 6, side walls 4 and 12 are secured together by a releasable fastener 24, FIG. 1, having a catch member fixed to the edge of side wall 4 and a pivotable fastener member fixed to the outer surface of side wall 12. In the same fashion, side walls 5 and 11 are secured together, in a location nearer end wall 6 than end wall 13, by a releasable fastener having a pivoted fastener member 25 secured to the outer surface of wall 5 and a catch member 26 secured to the edge of wall 11. Side wall 11 of unit 3 is provided with four feet 27, FIG. 1, and end wall 13 is provided with four feet 28, FIG. 6. End wall 6 is equipped with a conventional carrying handle 29 rigidly secured to the outer face of the wall.

Figure 2:
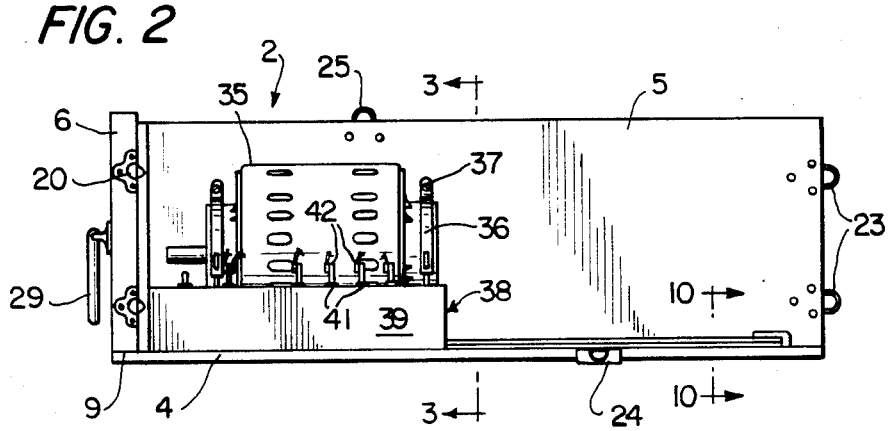
FIG. 2 is a side elevational view of one housing unit, with one motor and a connector block mounted thereon, forming part of the kit of FIG. 1.

In a location adjacent side wall 5 and end wall 6, a motor mount 32 is secured rigidly to the inner surface of side wall 4. Mount 32 comprises a base plate 33 and two upright end members 34 located each at a different end of the base plate and integral therewith, each end member 34 having an upwardly opening semicircular saddle dimensioned to accommodate one of the end hubs of an electric motor 35, a hold-down strap 36, tightened by screw 37, being provided to tighten strap 36 around the motor hub as shown. The overall length of motor 35 is such that the motor and motor mount occupy less than half of the length of housing unit 2 and little more than half of the width of side member 4, as shown in FIGS. 2 and 7.

Rigidly secured to the inner face of side wall 4 in a location beside motor mount 32 is a connector assembly 38 in the form of a box 39 having an on-off switch 40 and a plurality of female connector members 41 which, as will be clear from FIG. 9, will accept any one of a plurality of male connectors 42. Each male connector 42 comprises a banana-type plug 43 adapted to be inserted into any of the female connector members 41, plug 43 being electrically connected to one end of an insulated "jumper" conductor 44, each conductor 44 being connected at its other end to the plug 43 of another of the male connectors. Each connector 42 also includes, at its end opposite plug 43, a female connector socket 45 which is dimensioned to accept the male connector plug of any other connector 42 and is connected electrically to plug 43. Each female connector member 41 is connected electrically to an insulated conductor 46 and the conductors 46, housed within box 39. connect the female connectors 41 in predetermined circuit fashion according to the various manners in which motor 35 is to be connected for demonstration purposes, the motor being connected to the connector assembly via insulated conductors 46a. One end of box 39 abuts the inner face of end wall 6. End wall 6 is equipped with a conventional recessed male connector 47 adapted to receive the female plug of a supply cable (not shown), and connectors 46 are so arranged that, when a desired circuit has been established by insertion of male connectors 42 into selected ones of female connectors 41, the resulting circuit will be powered via recessed male connector 47.

In like fashion, housing unit 3 is provided with a motor mount 50 identical to motor mount 32 and located immediately adjacent end wall 13 and side wall 12, the motor mount being rigidly secured to side wall 11 and adapted to secure an electric motor 51. Secured to side wall 11 beside motor mount 50 is a connector assembly 52 which is identical to connector assembly 38, and end wall 13 is equipped with a recessed male connector 53, FIG. 6, via which power can be supplied to connector assembly 52. Comparing FIGS. 7 and 8, it will be seen that, when housing units 2 and 3 are interfitted in the manner shown in FIG. 1, there is adequate free space for each motor mount 32,50 and the motors, as well as the two connector assemblies 38,52. Yet, when the fasteners which secure the two housing units together in their interfitted relation are released housing unit 2 can be placed on a table or bench, side wall 4 down, and housing unit 3 can be placed on a table or bench, side wall 11 down, so that the respective motors and connector assemblies are completely exposed for work. In housing unit 2, the half of side wall 4 most distant from end wall 6 is left free and open after the motor mount and connector assembly have been installed. Similarly, in housing unit 3, the half of side wall 11 most distant from end wall 13 is left free and open after the motor mount and connector assembly have been installed. On the free inner surface of side wall 4 there is secured a chart 54, FIG. 10, covered by a sheet of transparent polymeric film 55 which can be marked with a grease pencil and then erased. Similarly, on the free inner surface of side wall 11 of housing unit 3, the combination of a chart and overlying transparent polymeric sheet are secured. In each case, the chart and polymeric film are rectangular and can be releasably secured by a clip 56 as seen in FIG. 10.

For each motor 35,51 chart 54 can carry a schematic diagram of the proper motor circuit, a pictorial diagram of the particular motor properly connected via the respective female connectors of the connector assembly 38,52 and a set of printed instructions requiring the student to, e.g., identify the motor type, mark on the polymeric film 55 the necessary connections for the jumper conductors to be made by use of the male connectors 42, and test of the motor with observation of, e.g., the direction of rotation.

What is claimed is:

1. In an educational kit for use in teaching the characteristics and use of electrical devices, the combination of
    two housing units each comprising side walls and an end wall,
        the two housing units being constructed and arranged to be fitted together to define a closed housing with the end walls of the two units disposed at different ends of the housing;
    means on one side wall of one of the housing units for mounting a first electrical device on a portion of that side wall adjacent one end thereof with the first electrical device so disposed as to be enclosed within the housing when the two housing units are fitted together;
    means on one side wall of the other of the housing units for mounting a second electrical device on a portion of that side wall adjacent one end thereof with the second electrical device so disposed as to be enclosed within the housing and located at the end of the housing opposite the position occupied by the first electrical device when the two housing units are fitted together; and
    releasable fastener means for securing the two housing units together when the housing units are interfitted to define the housing.

2. The combination defined in claim 1, wherein
    each means for mounting an electrical device is located adjacent the corresponding end wall.

3. The combination defined in claim 1, wherein
    the side walls on which the electrical devices are to be mounted are substantially longer than the respective electrical devices and, with the electrical devices mounted on the side walls, substantial portions of the inner faces of the respective side walls extend beyond the electrical devices;
    the combination further comprising
    two markable and erasable circuit instruction sheets each secured to a different one of the inner face portions of the side walls which extend beyond the electrical devices.

4. The combination defined in claim 1, wherein
    the side walls on which the electrical devices are to be mounted are significantly wider than required to accommodate the electrical devices;
    the means for mounting the electrical devices are each so located that, when the electrical device is mounted on the side wall, a significant portion of the inner face of the side wall is not covered by the electrical device;
    the combination further comprising
    two conductor assemblies each mounted on a different one of the side walls in a location beside that in which the electrical device is to be mounted, each of the connector assemblies comprising conductors and changeable connector devices via which the respective electrical devices can be connected in more than one fashion.

5. The combination defined in claim 4, wherein
    the end wall of each housing unit is provided with an electrical connector which is exposed to the exterior of the housing when the two housing units are fitted together to define the housing;
    each of the connector assemblies is adjacent a different one of the end walls; and
    each of the connectors is connected electrically to a different one of the connector assemblies, whereby the connector assemblies can be connected to a source of electrical power external to the housing.

6. The combination defined in claim 5, wherein
    one of the end walls is equipped with a handle by which the housing can be carried in upright position.

7. The combination defined in claim 1, wherein
    each of the housing units comprises two side walls and an end wall,
        each of said walls having the plan form of a quadrilateral,
        the two side walls of each unit being joined to each other along coextensive side edge portions, the end wall being joined to corresponding end edge portions of the two side walls; and the releasable fastener means comprises a plurality of fasteners each comprising an actuatable fastener unit and a catch unit with which the actuatable fastener unit can be engaged, some of the fasteners being arranged to secure together adjacent free edges of the side walls of the housing units when the housing units are interfitted to define the housing, others of the fasteners being arranged to secure together the end walls and corresponding end edge portions of the side walls.

* * * * *